(12) United States Patent
Becker

(10) Patent No.: US 10,480,598 B2
(45) Date of Patent: Nov. 19, 2019

(54) GUIDE DEVICE FOR THE BRAKE CALIPER OF A FLOATING CALIPER DISC BRAKE

(71) Applicant: Lucas Automotive GmbH, Koblenz (DE)

(72) Inventor: Marco Becker, Oberduerenbach (DE)

(73) Assignee: Lucas Automotive GmbH, Koblenz (DE)

(*) Notice: Subject to any disclaimer, the term of this patent is extended or adjusted under 35 U.S.C. 154(b) by 306 days.

(21) Appl. No.: 15/509,209

(22) PCT Filed: Sep. 1, 2015

(86) PCT No.: PCT/EP2015/069917
§ 371 (c)(1),
(2) Date: Jun. 29, 2017

(87) PCT Pub. No.: WO2016/037894
PCT Pub. Date: Mar. 17, 2016

(65) Prior Publication Data
US 2017/0261051 A1 Sep. 14, 2017

(30) Foreign Application Priority Data
Sep. 12, 2014 (DE) .......................... 10 2014 013 535

(51) Int. Cl.
*F16D 55/2265* (2006.01)
*F16D 65/00* (2006.01)

(52) U.S. Cl.
CPC ... *F16D 55/22655* (2013.01); *F16D 55/2265* (2013.01); *F16D 65/0087* (2013.01)

(58) Field of Classification Search
CPC ............ F16D 65/0087; F16D 55/2265; F16D 55/22655; F16D 55/227; F16D 65/0012; F16D 65/095; F16D 65/0006; F16J 3/046
(Continued)

(56) References Cited

U.S. PATENT DOCUMENTS 4,061,209 A 12/1977 Gee et al.
5,526,904 A * 6/1996 Walden ............. F16D 55/22655
188/73.44
(Continued)

FOREIGN PATENT DOCUMENTS

DE 2514383 A1 11/1975
DE 19710690 A1 11/1997
(Continued)

OTHER PUBLICATIONS

German Search Report, Application No. DE 102014013535.7, dated Jun. 10, 2015.
(Continued)

*Primary Examiner* — Robert A. Siconolfi
*Assistant Examiner* — San M Aung
(74) *Attorney, Agent, or Firm* — MacMillan, Sobanski & Todd, LLC

(57) ABSTRACT

A disc brake assembly for a motor vehicle braking system comprising a backing plate which has at least one borehole that defines a first longitudinal axis, and a guide pin which is arranged in the borehole and is designed to movably mount the brake caliper relative to the backing plate, wherein the guide pin defines a second longitudinal axis and the disc brake assembly further comprises a protective bellows which at least partially surrounds the regions of the guide pin that project from the borehole. The protective bellows has a guide section which is designed to displaceably guide the guide pin in such a way that the second longitudinal axis of the guide pin is offset relative to the first longitudinal axis of the borehole.

13 Claims, 2 Drawing Sheets

(58) Field of Classification Search
USPC .. 188/73.44, 73.45, 73.39, 73.32, 72.3, 72.4
See application file for complete search history.

(56) References Cited

U.S. PATENT DOCUMENTS

| | | | |
|---|---|---|---|
| 5,785,156 A * | 7/1998 | Warwick | F16D 55/22655 |
| | | | 188/73.32 |
| 5,931,267 A | 8/1999 | Iwata et al. | |
| 9,291,219 B2 | 3/2016 | Becker et al. | |
| 2009/0200122 A1 * | 8/2009 | Bagge | F16D 55/22655 |
| | | | 188/73.45 |
| 2013/0161134 A1 * | 6/2013 | Kobayashi | F16D 65/095 |
| | | | 188/73.44 |
| 2014/0116817 A1 | 5/2014 | Morais et al. | |
| 2014/0262637 A1 | 9/2014 | Smith et al. | |

FOREIGN PATENT DOCUMENTS

| | | |
|---|---|---|
| DE | 202006006142 U1 | 7/2006 |
| DE | 102011017220 A1 | 10/2012 |
| DE | 102013011469 A1 | 1/2015 |

OTHER PUBLICATIONS

PCT International Search Report, Application No. PCT/EP2015/069917, dated Jan. 29, 2016.

\* cited by examiner

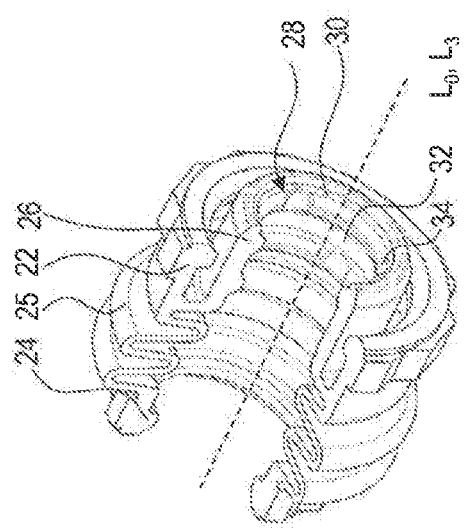
Fig. 3 – Prior Art
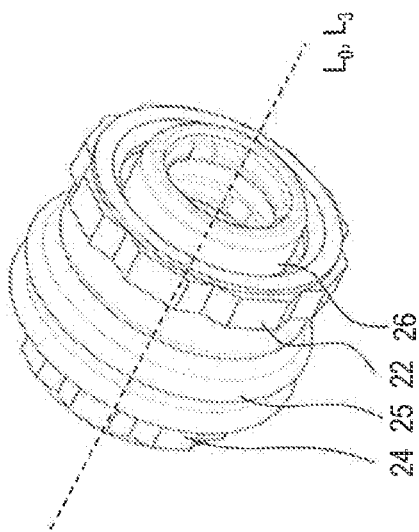
Fig. 4 – Prior Art
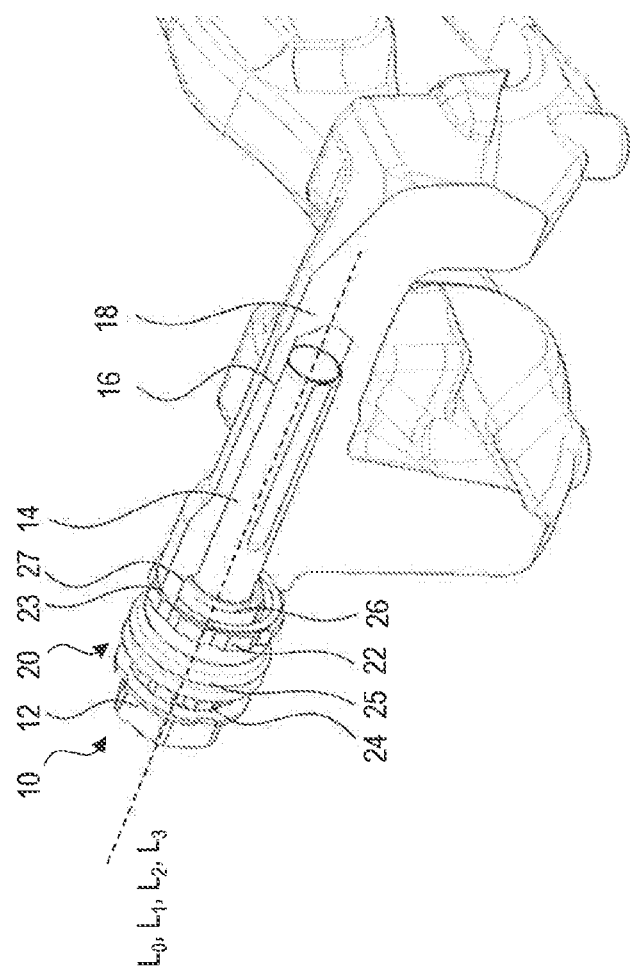
Fig. 2 – Prior Art

GUIDE DEVICE FOR THE BRAKE CALIPER OF A FLOATING CALIPER DISC BRAKE

CROSS-REFERENCE TO RELATED APPLICATIONS

This application is a national stage of International Application No. PCT/EP2015/069917 filed 1 Sep. 2015, the disclosures of which are incorporated herein by reference in entirety, and which claimed priority to German Patent Application No. 10 2014 013 535.7 filed 12 Sep. 2014, the disclosures of which are incorporated herein by reference in entirety.

BACKGROUND OF THE INVENTION

The present invention relates to a motor vehicle braking system, comprising a brake carrier, which has at least one bore defining a first longitudinal axis, and a guide pin, which is arranged in the bore and is configured to slidably support the brake caliper relative to the brake carrier, wherein the guide pin defines a second longitudinal axis, wherein the disc brake arrangement further comprises a protective bellows, which at least partially surrounds regions of the guide pin protruding from the bore.

Disc brake arrangements of this kind with a protective bellows are known from the prior art. Here the protective bellows serves in particular to seal the guide pin and the bore in the brake carrier from the environment. The protective bellows can also have a damping effect on the displacement movements of the guide pin, in order, for example, to avoid an audible metallic striking of the guide pin against the brake carrier caused by a functional play between guide pin and the bore in the brake carrier.

The document DE 10 2011 017 220 A1 discloses in this regard an exemplary solution, which is shown in FIGS. 2 to 4 of the present document. As is recognized in FIG. 2, in this solution a guide pin 10 is formed with a head region 12, from which a cylindrical shaft region 14 extends along a guide pin longitudinal axis $L_2$. The shaft region 14 is taken up for the most part in a bore 16 in a brake caliper 18 shown in a partial sectional view and is guided displaceably therein. The bore 16 defines a bore longitudinal axis $L_1$, which coincides in the case shown with the guide pin longitudinal axis $L_2$. In other words, the guide pin 12 with its shaft region 14 is taken up concentrically in the bore 16. Here the guide pin 12 protrudes in a known manner by a different extent from the bore 16 depending on the current operating state of the disc brake arrangement.

In FIG. 2 a protective bellows 20 is also shown, which is shown in FIGS. 3 and 4 in a single component view and in a partial sectional view. The protective bellows 20 has a first mounting section 22, which is mounted on the brake carrier 18 in a sealing manner in a recess 23. At its end lying axially opposite the mounting section 22, the protective bellows 20 has a second mounting section 24, which is mounted in the region of the head section 12 on the guide pin 10 in a sealing manner.

A detailed description of such a mounting solution by means of the sections 22 and 24 can be found in the document DE 20 2006 006 142 U1.

The two mounting sections 22, 24 are substantially configured ring-shaped and arranged concentrically to one another. A longitudinal axis $L_0$ of the protective bellows 20 extends through the respective center points of their ring-shaped cross sections. Furthermore, the mounting sections 22, 24 are connected by a deformation section 25 arranged in between in the form of a folding bellows, which is generally formed as a cylinder and likewise extends concentrically about the protective bellows longitudinal axis $L_0$. The protective bellows 20 thus surrounds the regions of the shaft portion 14 of the guide pin 10 that protrude from the bore 16 and follows their displacement movements via the second mounting section 24 with a deformation of the deformation section 25.

The protective bellows 20 further has a guide portion 26, which takes up a part of the shaft portion 14 of the guide pin 10 displaceably. As is recognized in FIGS. 3 and 4, the guide portion 26 is configured as a substantially cylindrical section of the protective bellows 20 that extends with a symmetrical cross section about a longitudinal axis $L_3$. It is further recognized that the guide portion 26 is arranged inside the first mounting section 22, which has a larger diameter. In the case shown, the guide portion 26 is arranged concentrically to the mounting sections 22, 24 and the deformation section 25, so that the protective bellows longitudinal axis $L_0$ and the guide portion longitudinal axis $L_3$ coincide. The guide portion 26 is also taken up in some sections in a recess 27 in the brake carrier.

In its inner circumferential region 28, the guide portion 26 has a contact surface 30, which is configured with grooves 32 and recesses 34 for adjusting the sealing and friction properties in guiding of the guide pin 10. The guide pin 10 is guided here in the protective bellows 20 in such a way that the guide pin longitudinal axis $L_2$ and the protective bellows and guide portion longitudinal axis $L_0$, $L_3$ coincide. Overall the guide portion 26 and the bore 16 are thus arranged as a whole in this solution in alignment or concentrically to one another, so that the guide portion longitudinal axis $L_3$ and the bore longitudinal axis $L_1$ also coincide.

It is generally advantageous if the guide pin is taken up in the bore with a certain functional play, in order to prevent seizing up. This concerns in particular a functional play transverse to the longitudinal axes of guide pin and bore. In other words, it is desirable if the guide pin is transversely or radially movable to a certain degree inside the bore. This makes it possible, for example, for the guide pin to get out of the way temporarily in such a direction in the event of a dynamic shift. As in the case discussed above, solutions in particular with guide pins guided concentrically in a bore with a uniformly circumferential radial guide play in a peripheral direction are known for this.

The document DE 197 10 690 A1 describes a disc brake with a sliding guide mechanism, which comprises a main guide pin and a subsidiary guide pin, which are each taken up axially movably in a guide hole. The subsidiary guide pin is arranged on a run-in side of a brake disc, while the main guide pin is arranged on the run-out side of the brake disc. Furthermore, rubber sleeves are provided on sections of the guide pins that protrude from the openings of the guide holes to repel water and dust. The subsidiary guide pin has a smaller diameter than the guide hole which takes up the subsidiary guide pin, so that the subsidiary guide pin is also movable radially in the guide hole. When braking is carried out, the subsidiary guide pin is pressed due to this by the forces transmitted by the brake disc against the inner diameter of the associated guide hole, whereby vibrations should be limited.

Further prior art is known from the document DE 25 14 383 A1, which describes a vehicle disc brake with a sliding connection between a caliper and a brake carrier, wherein the sliding connection comprises two pins. The pins are each taken up movably in an aperture that is formed oversized. The pins are further provided in some sections with sealing sheaths, which protect the sliding surfaces of the pins. A leaf spring is arranged between a crown part of the caliper and retaining plates of friction linings and pretensions the pins in an eccentric position in the respective openings.

In solutions of this kind, however, it has been shown that various disruptive influences can arise in the guiding of the guide pin in the bore of the brake carrier, which obstruct quiet operation of the disc brake, and this may be found disturbing by a vehicle operator. In particular, striking of the guide pin against the inner circumferential surface of the bore can occur in certain situations in the event of a displacement of the guide pin within the functional play provided. Friction vibrations between the brake lining and the brake disc can also be transmitted to the guide pin in this case and lead to pulsing movements and corresponding noises.

BRIEF SUMMARY OF THE INVENTION

A feature of the present invention, therefore, is to provide a disc brake arrangement for a motor vehicle braking unit of the type described at the beginning with improved guiding properties of the brake caliper relative to the brake carrier.

This feature is achieved by a disc brake arrangement for a motor vehicle braking system in which it is provided that the protective bellows has a guide portion, which is configured to guide the guide pin movably in such a way that the second longitudinal axis of the guide pin is offset relative to the first longitudinal axis of the bore.

Due to the offset arrangement of the longitudinal axes according to the invention, by which in particular an offset in a radial direction (transverse direction) with reference to the longitudinal axes is to be understood, the guide pin is arranged eccentrically, so to speak, in the bore of the brake carrier. Contrary to the known solutions from the prior art with a guide pin guided concentrically in a bore and a guide portion of the protective bellows, the latter is arranged according to the invention in at least a radial direction with a reduced distance to the inner circumferential surface of the bore. It can be provided in particular in this case that the second longitudinal axis of the guide pin is offset by such an extent relative to the longitudinal axis of the bore that at least one defined contact point is present between a circumferential partial region of the guide pin and an inner circumferential surface of the bore, so that the guide pin is brought into defined contact with the inner circumferential surface of the bore. In this connection the contact region can be formed as a single point, comprise several contact points viewed in the longitudinal direction of the guide pin or comprise a single or several linear or flat sections.

Due to the eccentric arrangement of the guide pin in the bore according to the invention, the effect of functionally induced vibrations can be reduced or even completely suppressed. In particular, by providing a defined metal contact region in a direct contact of the guide pin on the inner circumferential surface of the bore, transverse forces acting on the guide pin can be introduced directly into the brake carrier without the guide pin being shifted in the corresponding direction. In this connection the offsetting of the longitudinal axes relative to one another can be accomplished in particular in that, viewed in a radial direction, the offset direction corresponds to an expected main input direction of transverse forces in operation of the disc brake arrangement. It can further be provided according to the invention that the guide portion is formed to be elastically deformable, so that the guide pin is also guided with a necessary guide play in a transverse direction.

The inventor has further recognized that a particularly cost-effective solution can be provided by the offsetting of the longitudinal axes by means of the protective bellows.

As described below, in the variants according to the invention only a few components must be specifically configured or adapted to achieve the intended effect. This concerns, for example, only slight adaptation inside the guide portion of the protective bellows or a slightly modified arrangement of the protective bellows on the brake carrier. The other components from the known solutions according to the prior art can thus continue to be used unchanged as far as possible.

A development of the invention provides that the guide portion extends substantially about a third longitudinal axis. The guide portion can generally be configured in any way and determine the position of the second longitudinal axis of the guide pin. In particular, however, it can be provided that the guide portion extends about a certain external circumferential region of the guide pin, wherein the third longitudinal axis of the guide portion runs parallel to that of the guide pin. The guide portion can further be formed with a symmetrical cross section, in particular symmetrical to the third longitudinal axis, and extend axially along the third longitudinal axis. Extending symmetrically to the longitudinal axis is to be understood here in particular as forming the guide portion with a cross section that is point-symmetrical with reference to the point of intersection of the longitudinal axis with the cross sectional plane. A preferred variant provides that the guide portion is formed substantially cylindrically and takes up the shaft section of a guide pin in some sections.

In this connection it can further be provided according to the invention that the third longitudinal axis of the guide portion is offset relative the first longitudinal axis of the bore. It can also be provided according to the invention that the guide pin is guided by the guide portion so that the second longitudinal axis of the guide pin substantially coincides with the third longitudinal axis of the guide portion.

According to the above variants, the guide pin can thus be guided concentrically in the guide portion, wherein, however, the guide portion as such is arranged eccentrically to the bore and/or is not aligned with this. With reference to the solutions discussed above, it can therefore be provided according to the invention that the guide portion is arranged eccentrically inside the protective bellows, so that the guide portion longitudinal axis and the longitudinal axis of the protective bellows are offset radially to one another. It can also be provided according to the invention to configure the protective bellows substantially unchanged compared with the solution known from the prior art, but to arrange this on the brake carrier in such a way that the protective bellows as a whole is radially offset relative to the bore. In the latter case, the necessary adaptations can be restricted to the recess for taking up the first mounting section on the brake carrier, which is likewise to be configured radially offset or with a modified profile, for example. A cost-effective and reliable solution for facilitating the desired eccentric guiding of the guide pin in the bore is thus provided as a whole with the above variants.

A development of the invention provides that the guide portion has a guide region interacting with the guide pin, which region is formed at least in some sections with an asymmetrical cross section. The guide region can be configured in particular as the area of the guide region that is in contact with the guide pin and determines the position of its longitudinal axis. The cross section of the guide region can generally be open or closed. In this development in any case, however, it is provided that the cross section is formed asymmetrically, in particular with reference to the third longitudinal axis of the guide portion. It can be achieved thereby in this development that the third longitudinal axis of the guide portion does not coincide with the longitudinal axis of the guide pin, as the asymmetrical cross section forces the guide pin into a radially offset position inside the guide portion. In other words, it can be provided according to the invention that the guide pin is guided eccentrically in the guide portion and thus also in the bore of the brake carrier. This development also provides a cost-effective and reliable solution for achieving the desired longitudinal axis offset, as the necessary adaptations are substantially limited solely to the protective bellows starting out from the known solutions.

In this connection it can further be provided according to the invention that the guide region comprises an inner circumferential region of the guide portion. In other words, the guide region can be configured as the region of the guide portion that lies opposite the guide pin and at least partially surrounds or abuts this. The guide region is preferably configured as a tubular or cylindrical inner circumferential region of the guide portion and abuts the external circumferential surface of a shaft region of the guide pin at least in some sections.

It can further be provided according to the invention in this connection that the third longitudinal axis of the guide portion substantially coincides with the first longitudinal axis of the bore. In interaction with the asymmetrical cross section of the guide region, this development thus provides that the guide portion as such is arranged substantially concentrically to the bore in the brake carrier and/or is aligned with this. However, in this development the guide pin is guided due to the asymmetrical cross section of the guide region eccentrically in the guide portion, so that its longitudinal axis coincides neither with the longitudinal axis of the guide portion nor with that of the bore. In this variant the guide pin is thus radially offset both relative to the protective bellows and to the bore within the guide portion.

A development of the invention provides that the guide portion has at least one offset portion projecting radially inwards relative to the guide region. The offset portion can be configured in particular as a local portion of the guide region, which is in contact with the guide pin in such a way that it offsets this according to the invention relative to the longitudinal axis of the bore. The offset portion can be configured in this case as a local projection inside the guide region, for example in the form of a material thickening of the guide portion. In particular, the offset portion can be configured as the portion of the guide region that forms the asymmetrical share of the cross section of the guide region. It is advantageous in this variant that the offset portion can be produced with little effort as a one-piece constituent of the protective bellows and can also consist of an elastically deformable material. This permits the reliable provision of a pretensioning of the guide pin against the inner circumferential surface of the bore and also of a guide play in a transverse direction, as explained in greater detail below. In particular, the offset portion can define a region of the guide portion that provides an interference fit for the guide pin and/or its dimensions projecting radially inwards exceed a guide play of the guide pin in the sense of a diameter difference relative to the bore.

It can further be provided in this connection according to the invention that the at least one offset portion spans a defined circumferential area of the inner circumferential area. It can also be provided according to the invention here that the at least one offset portion is configured corresponding to those regions of the guide pin with which it interacts. In other words, the offset portion can thus be configured with a corresponding contour to an external circumferential region of the guide pin with which it is in contact. In particular, it can be provided according to the invention that the offset portion is in contact with a cylindrical shaft region of the guide pin over a certain circumferential area and is configured on its abutting inner side with a correspondingly curved contour. This permits reliable guiding of the guide pin inside the guide portion and reduces the inclination to noise emissions.

A development of the invention provides that the at least one offset portion extends axially over more than half of the longitudinal extension of the guide region and in particular that the offset portion extends axially substantially over the entire longitudinal extension of the guide region. By forming the offset portion with a maximum possible axial longitudinal extension, it can be guaranteed that the contact surface with the guide pin is increased in the longitudinal axis direction in such a way that tilting movements of the guide pin relative to the longitudinal axis are effectively suppressed. This improves the guiding properties and considerably reduces the inclination to noise generation.

A development of the invention provides that the protective bellows is arranged on the brake carrier, in particular that the protective bellows is taken up at least in some sections in a recess on the brake carrier. A secure mounting of the protective bellows and accurate relative positioning of the protective bellows to the brake carrier and the guide pin can be guaranteed by such a development.

It can further be provided in this connection that the protective bellows is arranged on the brake carrier via an external circumferential area of the guide portion. For example, the guide portion in this variant can engage in a recess in the brake carrier in the region of the bore via an external circumferential area.

It can further be provided according to the invention that when arranging the protective bellows on the brake carrier, a pretensioning force can be introduced into the guide portion in such a way that this is pretensioned in contact with the guide pin. For example, the recess in which the protective bellows can be taken up via its guide portion in particular can be dimensioned smaller than the corresponding portion of the protective bellows. The guide portion can thus be definitively deformed elastically when arranged on the brake carrier. In particular, pretensioning transverse forces can be introduced here, which act on the guide pin via the guide region and in particular its offset portion. The guide pin can thus be pretensioned with a defined transverse force against an inner circumferential surface of the bore, wherein an adequate guide play in a transverse direction is also provided by the elastic deformability of the guide region. These pretensioning forces can generally be introduced alternatively or in addition to the aforesaid pretensioning forces of the guide portion, for example in addition to a take-up of the guide pin in the guide portion with an interference fit.

In the variants named above, in deviation from the concentrically guided guide pin according to the prior art, it can also be provided in particular according to the invention that in the unactuated state of the brake, the guide pin permanently abuts a predetermined portion of the inner circumferential surface of the bore in metal contact under pretensioning by the preferably elastic guide portion. This is preferably the bore section which, when braking is initiated, the guide pin would strike first in conventional, concentric guiding in the bore after the functional play between guide pin and bore has been used up. This thus concerns in particular the section that lies opposite an expected main input direction of transverse forces or is penetrated by this. To achieve a durable pretensioning, the guide portion can be configured in this case with an eccentricity in a transverse direction that exceeds a functional play by a defined extent in the sense of a diameter difference between the bore and the guide pin.

The invention further relates to a protective bellows for a disc brake arrangement according to one of the variants described above.

Other advantages of this invention will become apparent to those skilled in the art from the following detailed description of the preferred embodiments, when read in light of the accompanying drawings.

BRIEF DESCRIPTION OF THE DRAWINGS

FIG. 2 illustrates a partial view of a disc brake arrangement according to the prior art with a brake carrier shown in a partial sectional view and guide pin guided therein and protective bellows;

FIG. 3 illustrates a partial sectional view of the protective bellows from FIG. 3; and FIG. 4 illustrates a single component representation in perspective of the protective bellows from FIG. 2.

DETAILED DESCRIPTION OF THE INVENTION

Figure 1:
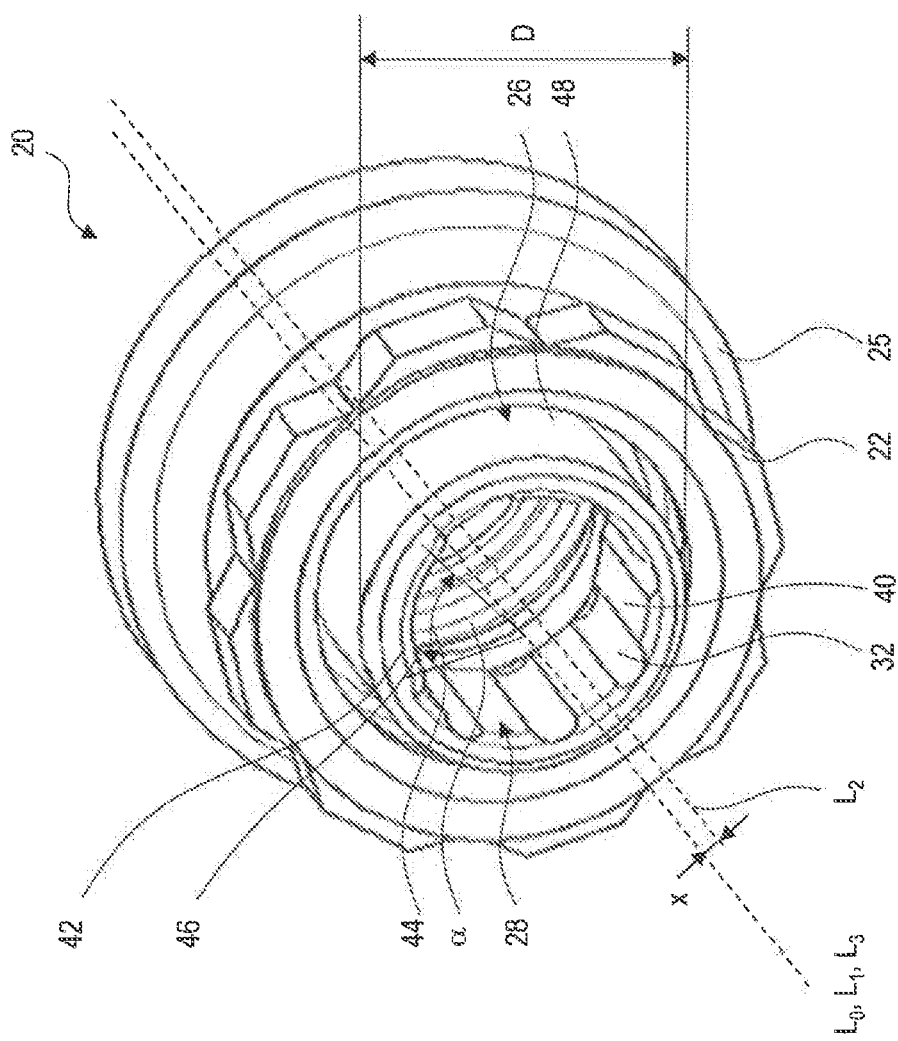
FIG. 1 illustrates a single component representation in perspective of a protective bellows for a disc brake arrangement according to a practical example of the invention.

In FIG. 1, a protective bellows according to an embodiment of the invention is shown and generally designated 20. The basic construction of the protective bellows 20 substantially corresponds to the construction according to the prior art described in connection with FIGS. 2 to 4, with the exception of the guide portion 26. The other components of the disc brake arrangement are also formed analogously to the solution shown in FIGS. 2 to 4 and are not shown separately in FIG. 1. However, for a better understanding, the reference signs inserted with reference to FIGS. 2 to 4 for identical components or components with an identical action are also used in the description of FIG. 1.

In FIG. 1, the protective bellows 20 is shown in an orientation facing a brake carrier 18 (not shown in FIG. 1). A first mounting section 22 is again recognized, with which the protective bellows 20 can be mounted in a known manner on the brake carrier 18. The protective bellows 10 further comprises a deformation section 25 in the form of a deformable folding bellows, which conceals a second mounting section 24 lying behind it in FIG. 1. The mounting sections 22, 24 and the deformation section 25 are substantially formed with a ring-shaped cross section and extend concentrically about a longitudinal axis $L_0$ of the protective bellows 20.

The protective bellows 20 further comprises a substantially cylindrically configured guide portion 26, which extends about a longitudinal axis L3. In the example shown, the guide portion 26, the mounting section 22, 24 and the folding bellows 25 are arranged concentrically to one another, so that the protective bellows longitudinal axis L0 and the longitudinal axis L3 of the guide portion 26 coincide.

It is further recognized in FIG. 1 that the guide portion 26 is formed with a guide region 40 on its inner circumferential area 28. This forms the region of the guide portion 26 that can be brought into contact with an external circumferential surface of a cylindrical shaft region 14 of a conventional guide pin 10 (not shown in FIG. 1). The guide region 40 has several axial grooves 32 distributed in a circumferential direction, which adjust the friction conditions between the guide portion 26 and the guide pin 10 in a known manner and/or can take up lubricants.

On an upper circumferential partial segment of the guide region 40 in FIG. 1, an offset portion 42 is also arranged, which extends over a defined circumferential area 44, which encloses an angle a of approx. 60°. The offset portion 42 also extends along the third longitudinal axis L3 of the guide portion 26 over its entire longitudinal extension.

As is evident from FIG. 1, the offset portion 42 forms a projection protruding radially inwards with reference to the remaining, substantially round cross section of the guide region 40 and thus forms an asymmetrical cross section area of the guide region 40 with reference to the third longitudinal axis L3. In the case shown, the offset portion 42 is formed from elastomer material as a local material thickening or increase in the wall thickness of the guide portion 26.

The offset portion 42 is further configured with a contact surface 46 pointing inwards, with which it can be brought into contact with an external circumferential area of the guide pin 10. The contact surface 28 is formed in this case with a curved contour, wherein the curvature corresponds to the shape of the external circumferential surface of the guide pin 10. The offset portion 42 further defines a section of the guide region 40 in which the guide pin 10 is taken up in an interference fit.

In the embodiment shown, a radially inward projecting contact portion of the guide portion 26 is provided by the offset portion 42. In the mounted state in particular, a transverse force is exerted by this on the guide pin 10, so that this assumes an eccentric position under pretensioning, in which the position of its longitudinal axis $L_2$ is radially offset relative to the longitudinal axis $L_3$ of the guide portion. In FIG. 1, the position of the longitudinal axis $L_2$ of the guide pin 10 is indicated accordingly. It is recognized that the second longitudinal axis $L_2$ runs eccentrically or radially offset to the longitudinal axis Lo of the protective bellows 20 and the third longitudinal axis $L_3$ of the guide portion 26 and is spaced radially at a distance x from these.

Since the protective bellows 20 in the embodiment shown is arranged, analogously to the variant known from the prior art according to FIG. 2, concentrically to a bore 16 in the brake carrier 18 (not shown), the guide pin 10 and its second longitudinal axis L2 are also radially offset inside the bore 16 in the mounted state. A corresponding position of the longitudinal axis L1 of the bore 16 is likewise indicated in FIG. 1 and coincides with the longitudinal axes L0 of the protective bellows 20 and the longitudinal axis L3 of the guide portion 26. Thus the second longitudinal axis L2 of the guide pin 10 is radially offset also relative to the longitudinal axis L1 of the bore by the distance x by the contact to the offset portion 40. The distance x here is chosen so that the guide pin 10 is in metal contact with an inner circumferential surface of the bore 16 under elastic pretensioning due to the offset portion 42.

To achieve a defined pretensioning force, the guide portion 26 is further configured with a cylindrical outer circumferential surface 48, which has a defined diameter D. With this external circumferential surface 48 the guide portion 26 can be taken up, by analogy with the solution known from the prior art, in a recess 27 on the brake carrier 18 (not shown) in the mounted state. Here the diameter D of the guide portion 26 is selected so that this slightly exceeds a corresponding diameter of the take-up recess 27. The guide portion 26 is elastically deformed thereby under the influence of a corresponding transverse force when arranged on the brake carrier 18. In this case the transverse force also acts via the offset portion 42 on the guide pin 10 and pretensions this against the inner circumferential surface of the bore 16 along the distance marked by an x. Since the protective bellows 20 in the case shown is manufactured as a whole in one piece and from an elastic material, the guide pin 10 is provided with a guide play in a transverse direction, in particular in a direction opposed to the pretensioning direction.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A disc brake arrangement for a motor vehicle braking system comprising a brake carrier, which has at least one bore defining a first longitudinal axis, and a guide pin, which is arranged in the bore and is configured to support the brake caliper slidably relative to the brake carrier, wherein the guide pin defines a second longitudinal axis,
   wherein the disc brake arrangement further comprises a protective bellows, which at least partially surrounds regions of the guide pin protruding from the bore,
   wherein the protective bellows has a guide portion, which is configured to guide the guide pin displaceably in such a way that the second longitudinal axis of the guide pin is offset relative to the first longitudinal axis of the bore;
   wherein the guide portion extends substantially about a third longitudinal axis;
   wherein the third longitudinal axis of the guide portion is offset relative to the first longitudinal axis of the bore.

2. The disc brake arrangement according to claim 1, wherein the guide pin is guided by the guide portion in such a way that the second longitudinal axis of the guide pin substantially coincides with the third longitudinal axis of the guide portion.

3. The disc brake arrangement according to claim 1, wherein the guide portion has a guide region that interacts with the guide pin and is formed at least in some sections with an asymmetrical cross section.

4. The disc brake arrangement according to claim 3, wherein the guide region comprises an inner circumferential area of the guide portion.

5. The disc brake arrangement according to claim 1, wherein the protective bellows is arranged on the brake carrier such that the protective bellows is taken up at least in some sections in a recess on the brake carrier.

6. The disc brake arrangement according to claim 5, wherein the protective bellows is arranged via an external circumferential area of the guide portion on the brake carrier.

7. The disc brake arrangement according to claim 5, wherein, when arranging the protective bellows on the brake carrier, a pretensioning force can be introduced into the guide portion so that this is pretensioned in contact to the guide pin.

8. A protective bellows for the disc brake arrangement according to claim 1.

9. A disc brake arrangement for a motor vehicle braking system comprising a brake carrier, which has at least one bore defining a first longitudinal axis, and a guide pin, which is arranged in the bore and is configured to support the brake caliper slidably relative to the brake carrier, wherein the guide pin defines a second longitudinal axis,
   wherein the disc brake arrangement further comprises a protective bellows, which at least partially surrounds regions of the guide pin protruding from the bore,
   wherein the protective bellows has a guide portion, which is configured to guide the guide pin displaceably in such a way that the second longitudinal axis of the guide pin is offset relative to the first longitudinal axis of the bore;
   wherein the guide portion extends substantially about a third longitudinal axis;
   wherein the guide portion has a guide region that interacts with the guide pin and is formed at least in some sections with an asymmetrical cross section;
   wherein the third longitudinal axis of the guide portion substantially coincides with the first longitudinal axis of the bore.

10. A disc brake arrangement for a motor vehicle braking system comprising a brake carrier, which has at least one bore defining a first longitudinal axis, and a guide pin, which is arranged in the bore and is configured to support the brake caliper slidably relative to the brake carrier, wherein the guide pin defines a second longitudinal axis,
    wherein the disc brake arrangement further comprises a protective bellows, which at least partially surrounds regions of the guide pin protruding from the bore,
    wherein the protective bellows has a guide portion, which is configured to guide the guide pin displaceably in such a way that the second longitudinal axis of the guide pin is offset relative to the first longitudinal axis of the bore;
    wherein the guide portion extends substantially about a third longitudinal axis;
    wherein the guide portion has a guide region that interacts with the guide pin and is formed at least in some sections with an asymmetrical cross section;
    wherein the guide portion has at least one offset portion projecting radially inwards relative to the guide region.

11. The disc brake arrangement according to claim 10, wherein the at least one offset portion spans a defined circumferential area of the inner circumferential area.

12. The disc brake arrangement according to claim 10, wherein the at least one offset portion is configured corresponding to the regions of the guide pin with which it interacts.

13. The disc brake arrangement according to claim 10, wherein the at least one offset portion extends axially over more than half of the longitudinal extension of the guide region, and in particular that the offset portion extends axially substantially over the entire longitudinal extension of the guide region.

* * * * *